United States Patent [19]

Fang et al.

[11] Patent Number: 5,049,720
[45] Date of Patent: Sep. 17, 1991

[54] LASER WELDING APPARATUS WITH SKY WINDOW

[75] Inventors: Jin-Liou Fang, San Jose; Kenny H. Mikami, Santa Clara, both of Calif.

[73] Assignee: FMC Corporation, Chicago, Ill.

[21] Appl. No.: 571,692

[22] Filed: Aug. 24, 1990

[51] Int. Cl.⁵ ............................................ B23K 26/00
[52] U.S. Cl. ........................ 219/121.63; 219/121.76; 219/121.77; 219/121.84; 219/121.81; 219/121.74
[58] Field of Search .................. 219/121.63, 121.64, 219/121.73, 121.6, 121.85

[56] References Cited
U.S. PATENT DOCUMENTS 3,217,088  11/1965  Steierman ................. 219/121.64 X
3,463,898  8/1969   Takaoka et al. ........... 219/121.73 X
4,341,942  7/1982   Chaudhari et al. ........ 219/121.63 X
4,914,269  4/1970   Kinsman ................... 219/121.64

Primary Examiner—C. L. Albritton
Attorney, Agent, or Firm—R. C. Kamp; R. B. Megley; L. B. Guernsey

[57] ABSTRACT

A laser welding apparatus having a sky window in a device for pressing two materials together during a welding operation. The pressing device holds a plastic lid material snugly against a plastic container during the welding operation. A laser-transparent window in the pressing device allows a laser beam to be directed through the pressing device to a junction between the lid material and the container. The laser beam is converted into heat to weld the lid material to the container.

8 Claims, 3 Drawing Sheets

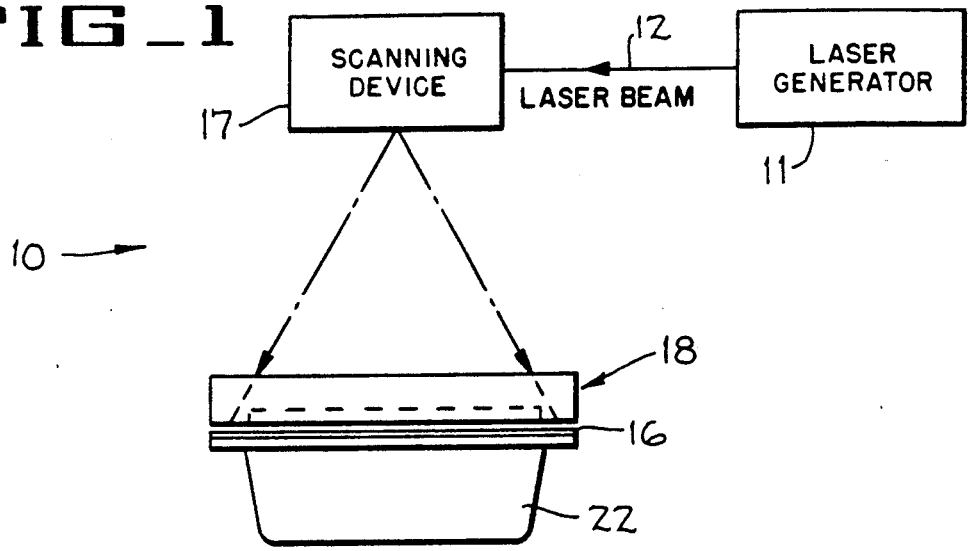
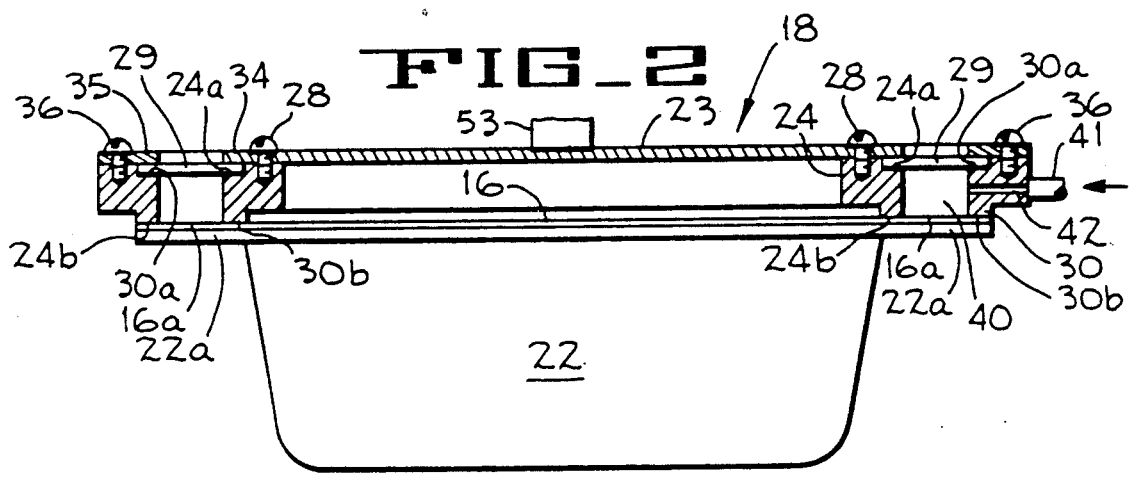
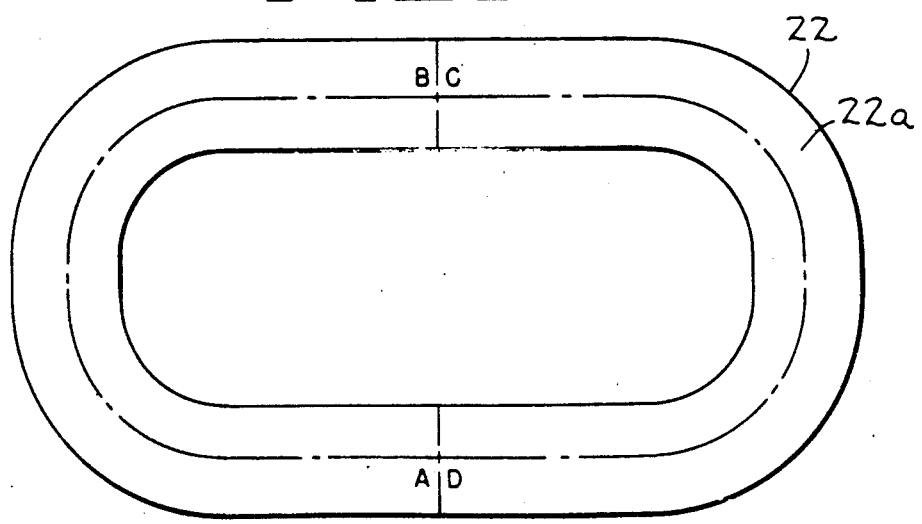

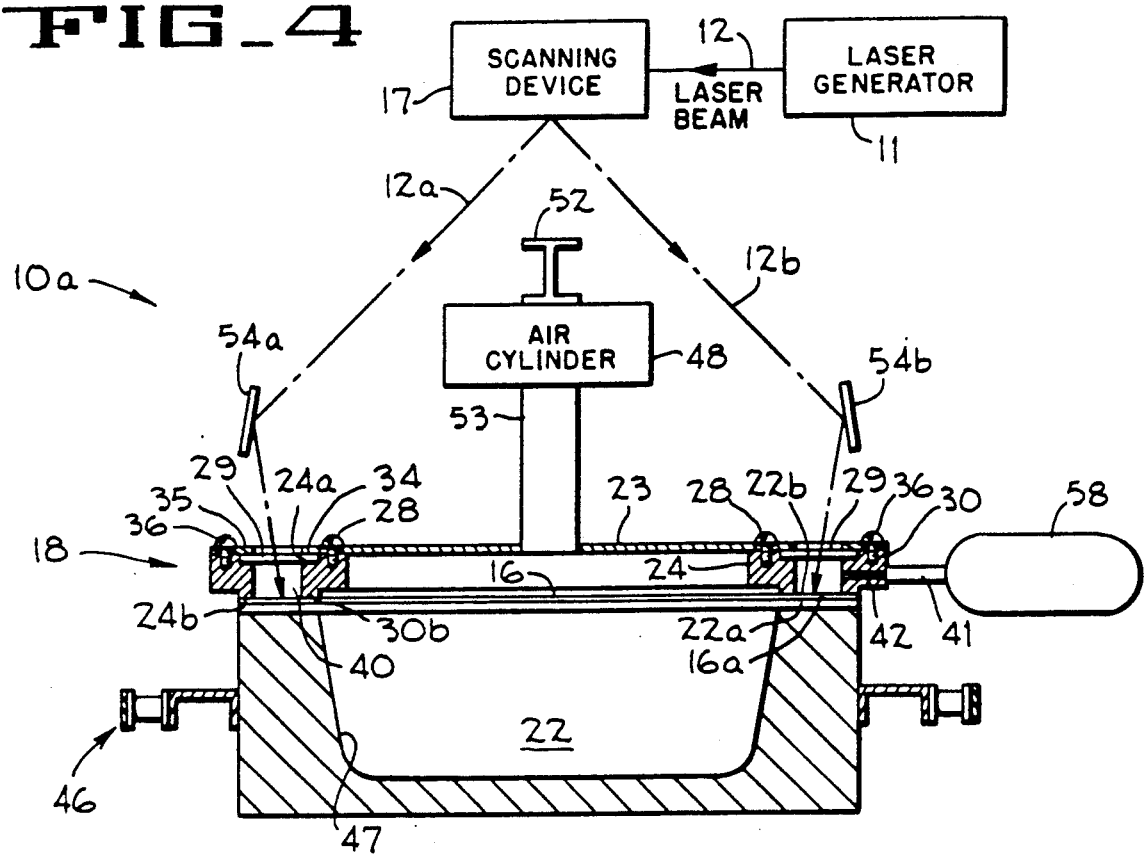
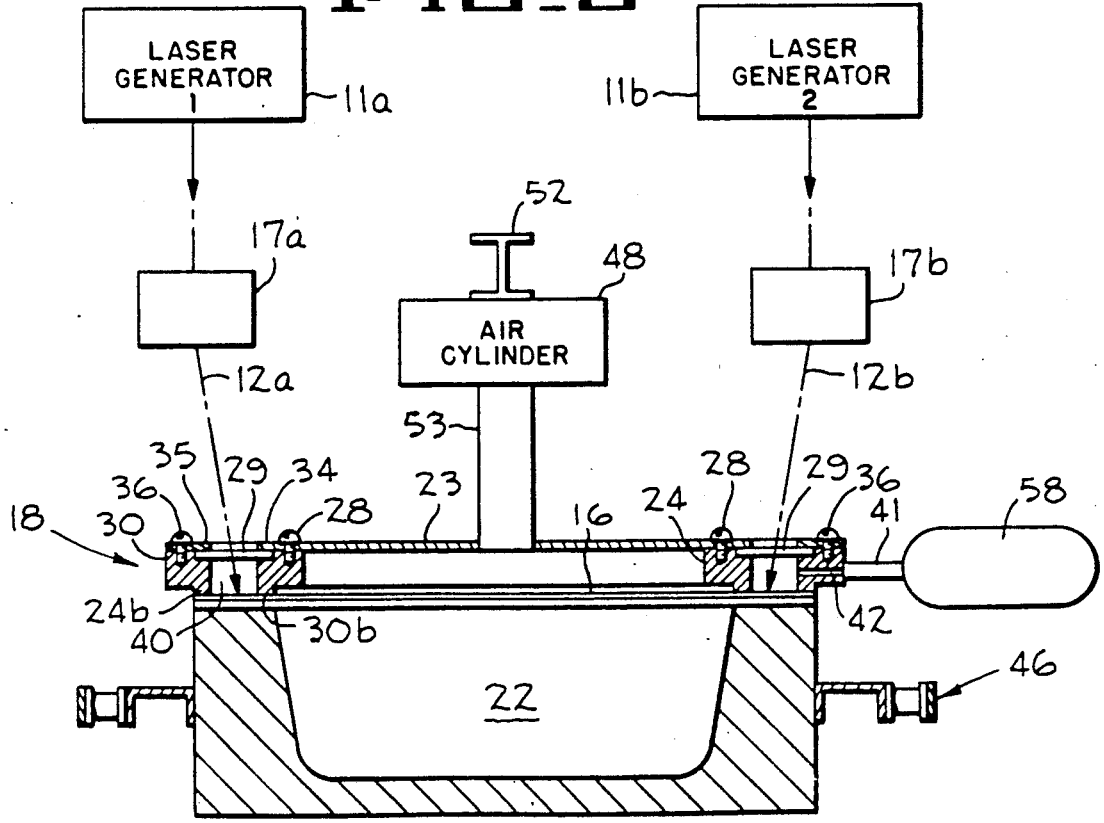

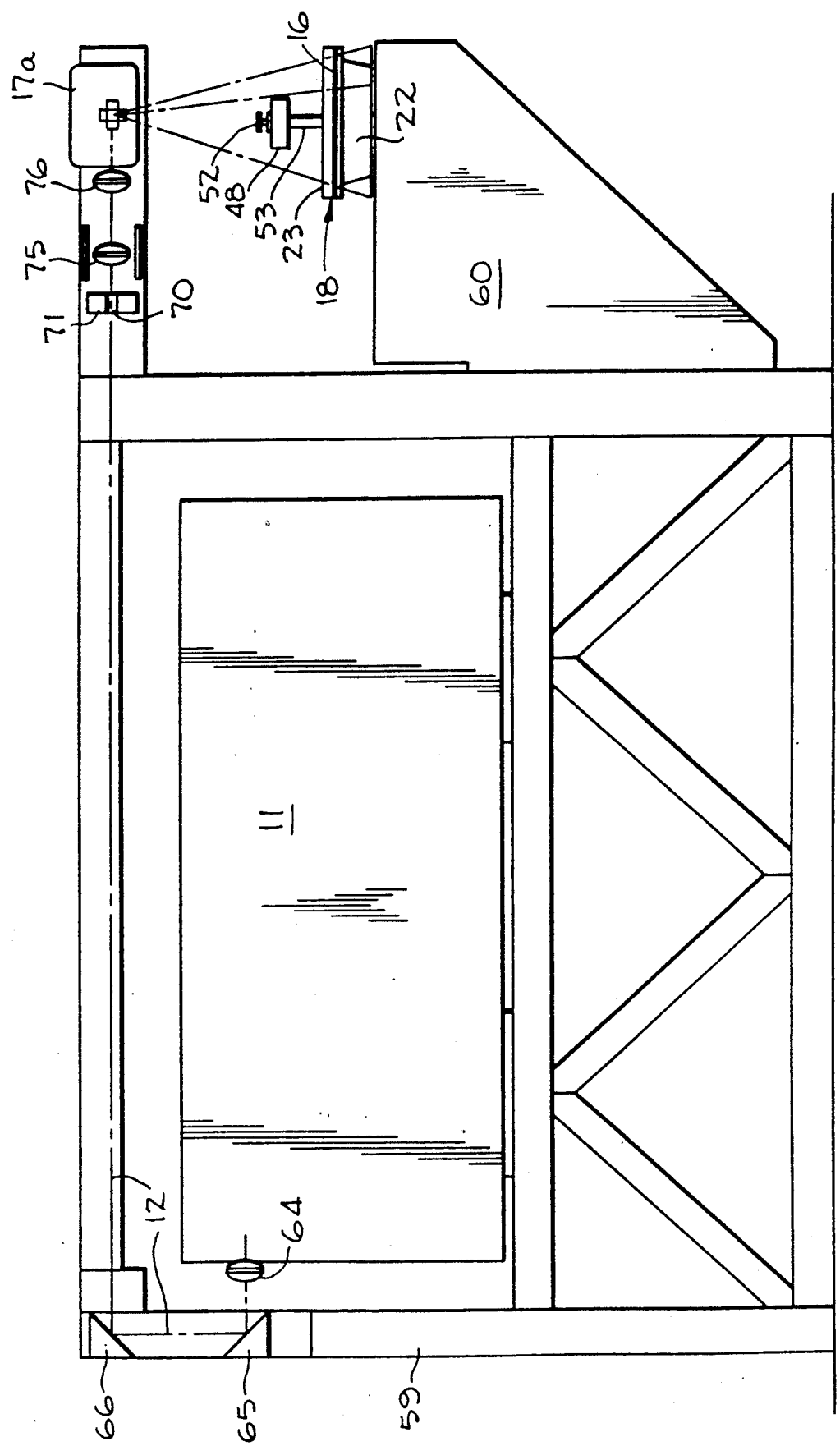
FIG_6

LASER WELDING APPARATUS WITH SKY WINDOW

BACKGROUND OF THE INVENTION

The present invention relates to a plastic welding apparatus, and more particularly, to a laser welding apparatus having a pressing device with a window which allows a laser beam to pass through and weld two materials together while the pressing device holds the material together.

Plastic containers are widely used for the packaging of food and for a wide variety of other items wherein a pouch is formed by folding a flat piece of plastic membrane into a general form of a bag, and one edge of the membrane is sealed to another edge by the use of heat. In another application, a semi-rigid plastic container is filled with a product and a plastic lid is bonded to the container by the application of heat. The required heat can be provided by an electric hot plate which partially melts portions of the lid and container so the lid fuses to the container. When the hot plate is mounted adjacent to the lid, heat must transfer through the lid to the junction between the lid and the container in order to melt portions of the container which fuses to the lid. As a result the operation is relatively slow.

Another method of bonding involves the use of laminated plastic lids each having a layer of metal foil. An oscillating magnetic field induces an electrical current into the metal foil to develop heat which melts portions of the lid and container and fuses the lid to a lip of the container. An induction coil having an electrical current directs the oscillating magnetic field to an area adjacent to the junction of the lid and container lip. This operation will not work with an all-plastic material. Either the laminated lid material or the material in the container must include a layer of metal material so the magnetic field can induce an electrical current in the metal material for heating the adjacent layers of plastic.

SUMMARY OF THE INVENTION

The present invention discloses a laser welding apparatus for welding a plastic lid material to a plastic container using a pressing device to hold the lid material snugly against the container. A laser-transparent window in the pressing device allows a laser beam to be directed through the device to a junction between the lid material and the container while the lid material is held securely against the container. The laser beam is converted into heat to weld the lid material to the container in a uniform manner and insures homogeneous sealing of the container.

BRIEF DESCRIPTION OF THE DRAWINGS

FIG. 1 is a side elevation of a basic plastic welding apparatus having a device for pressing a lid against a container during a welding operation.

FIG. 2 is an enlarged side elevation of a portion of FIG. 1 showing details of a laser window in the pressing device.

FIG. 3 is a plan view of the container of FIG. 2.

FIG. 4 is a side elevation of one embodiment of a plastic welding apparatus used with the present invention.

FIG. 5 is a side elevation of another embodiment of a plastic welding apparatus used with the present invention.

FIG. 6 is a side elevation of a plastic welding apparatus in which the present invention can be used.

DESCRIPTION OF THE PREFERRED EMBODIMENT

A plastic welding apparatus 10 (FIG. 1) includes a laser generator 11 which develops a laser beam 12 that is directed to a plastic lid material 16 by a scanning device 17. A pressing device 18 presses lid material 16 against a container 22 to insure homogeneous sealing of the lid material to the container. The pressing device 18 must be made of a laser transparent material or an opening must be provided for laser beam 12 to reach lid material 16.

An improved pressing device 18 of the present invention (FIG. 2) includes an annular plate 23 connected to an annular inner ring 24 by a plurality of machine bolts 28. An annular sky window 29 is connected between inner ring 24 and an annular outer ring 30 by a pair of annular clamps 34, 35 and by a plurality of machine bolts 36 and 28. When the laser beam is developed by a $CO_2$ laser with a usual wavelength of 10.6 microns, sky window 29 can be made of a variety of materials such as zinc solenoid, germanium, zinc sulfide, potassium chloride, potassium bromide, silver chloride, and silver bromide. When a YAG laser with a usual wavelength of 1.06 microns is used, sky window can be made of quartz, UV fused silica, IR fused silica and other materials as well as the materials listed for use with a $CO_2$ laser.

An inner portion of sky window 29 is clamped between annular clamp 34 and a shoulder 24a on inner ring 24. An outer portion of sky window 29 is clamped between annular clamp 35 and a shoulder 30a on outer ring 30. When device 18 is pressed downward (FIG. 2) a lower end 24b of inner ring 24 and a lower end 30b of outer ring 30 provide a seal with lid material 16 to form an air-tight chamber 40. When pressurized air is attached to an inlet 41 air flows through a passage 42 to chamber 40. Pressurized air in chamber 40 presses an outer portion 16a of lid material 16 downward against a lip 22a of container 22 to provide a homogeneous seal when portion 16a and lip 22a are heated.

A production welding apparatus 10a for sealing plastic lids to plastic containers is disclosed in FIG. 4. A conveyor 46 having a plurality of nests 47 (only one being shown), each for holding a container 22 moves the containers sequentially into position under pressing device 18. An air cylinder 48 mounted on a beam 52 is attached to plate 23 by a rod 53 to raise and lower device 18. When device 18 is lowered into a sealing position, rings 24, 30 press lid material 16 against lip 22a of container 22. A pressurized air supply 58 (FIG. 4) provides increased air pressure inside chamber 40 to press lid material 16 uniformly against container lip 22a between rings 24 and 30. Scanning device 17 splits laser beam 12 into a pair of laser beams 12a, 12b and directs the laser beams to a pair of mirrors 54a, 54b. Scanning device 17 and mirror 54a direct laser beam 12a through window 29 to scan lip 22a (FIG. 3) of container 22 from point A along lip 22a to point B. At the same time device 17 and mirror 54b directs laser beam 12b through window 29 to scan lip 22a from point C to point D to seal lid material 16 to lip 22a.

Lid material 16 is made of a material which is semi-transparent to laser beams 12a, 12b so these laser beams impinge upon an upper surface 22b of container 22 (FIG. 4). Container 22 is made of a material which is opaque to the laser beams 12a, 12b so the energy in these laser beams is converted into heat at the junction of lid 16 and container lip 22a. The heat partially melts a portion of the lid material and a portion of the container material. When the laser beam is turned off device 18 continues to press against lid material 16 for a short period of time while the lid material and container material solidify and provide a seal.

Another embodiment of the present invention (FIG. 5) uses a pair of laser generators 11a, 11b and a pair of scanning devices 17a, 17b to direct laser beam 12a to scan lip 22a (FIG. 3) from point A to point B and simultaneously direct laser beam 12b to scan lip 22a from point C to point D. The dual scanning of the laser beams 12a, 12b provides rapid welding of lid material 16 to lip 22a of container 22.

A front view of a plastic welding apparatus 10 in which the present invention can be used is illustrated in FIG. 6. Apparatus 10 includes a frame 59 for supporting laser generator 11 and an attached container support 60. Container 22 and lid material 16 can be placed on support 60 by a robot or conveyor 46 (FIGS. 4, 5) can be mounted on support 60 to move the containers into a sealing position. Laser beam 12 from generator 11 is directed by a lens 64, mirrors 65, 66 through a hole 70 in an aperture plate 71 to lenses 75, 76 and a scanning device 17a. Device 17a can be used to split the beam into beams 12a, 12b as shown in FIG. 4 or by other means well known in the laser art.

Thus, the laser window in the pressing device allows the laser beams to pass through the window and weld the lid material to the container lip while holding the lid material snugly against the container lip. This provides an improved seal having a greater uniformity.

Although the best mode contemplated for carrying out the present invention has been herein shown and described, it will be apparent that modification and variation may be made without departing from what is regarded to be the subject matter of the invention.

What is claimed is:

1. A laser welding apparatus for sealing a plastic lid material to a plastic container, said apparatus comprising:
    means for generating a laser beam;
    a device for pressing a plastic lid material firmly against a portion of a container;
    a laser-transparent window mounted in said pressing device;
    means for directing said laser beam through said window to said lid material to develop heat for sealing said lid material to said container;
    means for forming an air-tight chamber between said window and said lid material; and
    means for pressurizing said chamber to press said lid material against a portion of said container to facilitate sealing said lid material to said container as said laser beam heats said lid material and said container.

2. A laser welding apparatus as defined in claim 1 wherein said container includes a lip around an opening in said container and wherein said window is shaped to facilitate the transfer of said laser beam from said laser generator, through said window to heat a portion of said lid material adjacent to said container lip.

3. A laser welding apparatus for sealing a plastic lid material to a plastic container, said apparatus comprising:
    means for generating a laser beam;
    a device for pressing a plastic lid material firmly against a portion of a container;
    a laser-transparent window mounted in said pressing device with said window being spaced from said lid material as said device presses against said lid material; and
    means for directing said laser beam through said window to said lid material to develop heat for sealing said lid material to said container.

4. A laser welding apparatus having means for pressing a plastic lid against a lip of a container while directing a laser beam through the lid to the container lip to provide an improved sealing operation, said apparatus comprising:
    an inner wall member having a lower portion for fitting against a radially inward portion of a container lip;
    an outer wall member having a lower portion for fitting against a radially outward portion of said container lip;
    a laser-transparent window mounted between said inner wall member and said outer wall member;
    means for pressing said lower portion of said inner wall member and said lower portion of said outer wall member against a portion of a lid to press portions of said lid against portions of said container lip; and
    means for directing a laser beam through said window toward said container lip to develop heat for sealing said lid to said container.

5. A laser welding apparatus as defined in claim 4 wherein the pressing of said inner wall member an said outer wall member against a portion of said lid provides an air-tight chamber between said inner and said outer wall members, said apparatus including means for pressurizing said chamber to force said lid snugly against said container lip during a sealing operation.

6. A laser welding apparatus as defined in claim 4 including means for providing an air-tight seal between said window and each of said wall members, and wherein the pressing of said inner wall member and said outer wall member against a portion of said lid provides an air-tight chamber between said inner and said outer wall members, said apparatus including means for pressurizing said chamber to force said lid snugly against said container lip during a sealing operation.

7. A laser welding apparatus as defined in claim 4 wherein said lid is formed of material which is semi-transparent to said laser beam and said container is formed of material which is opaque to said laser beam, said laser beam being directed through said lid material to said container where said laser beam is converted into heat to partially melt said lid and said container lip for sealing said lid to said container lip.

8. A laser welding apparatus as defined in claim 3 including means for forming an air-tight chamber between said window and said lid material and mean for pressurizing said chamber to press said lid material against a portion of said container to facilitate sealing said lid material to said container as said laser beam heats said lid material and said container.

* * * * *